United States Patent [19]

Sawada

[11] 4,226,577
[45] Oct. 7, 1980

[54] APPARATUS FOR INJECTION MOLDING OF CONTINUOUS SLIDE FASTENER CHAIN

[76] Inventor: Mitsuo Sawada, 1-1 Horitaka, Kurobe-shi, Toyama-ken, Japan

[21] Appl. No.: 54,421

[22] Filed: Jul. 3, 1979

[30] Foreign Application Priority Data

Jul. 4, 1978 [JP] Japan .............................. 53/92716[U]

[51] Int. Cl.² .............................. B29D 5/00; B29F 1/06
[52] U.S. Cl. .................................... 425/111; 425/545; 425/814; 425/129 R
[58] Field of Search ................ 425/111, 116, 122, 127, 425/129 R, 545, 814, 805, DIG. 34

[56] References Cited
U.S. PATENT DOCUMENTS

| | | | |
|---|---|---|---|
| 2,471,258 | 5/1949 | Bolten | 425/814 |
| 2,742,670 | 4/1956 | Morin | 425/814 |
| 3,590,109 | 6/1971 | Doleman et al. | 425/805 |
| 3,659,308 | 4/1972 | Kutik et al. | 425/805 |
| 4,074,413 | 2/1978 | Taccani | 425/814 |

Primary Examiner—J. Howard Flint, Jr.

[57] ABSTRACT

Disclosed is an injection molding apparatus for the manufacture of continuous slide fastener chain. In the disclosed arrangement a small projection is formed on a portion of a runner molded together with a row of fastener elements at the time the elements are injection molded on a pair of stringer tapes, the small projection being detected as a portion of the as yet unfinished slide fastener chain when the stringer tapes are fed. Upon detection of the projection the introduction of the tapes into the molds is halted and the tapes, which have been intentionally fed to an excessive degree, are retracted by an amount equal to such excess. During the retraction the posterior end of the runner abuts a stopper provided on one of the pair of molds thereby to position the tapes for the next injection molding cycle.

2 Claims, 5 Drawing Figures

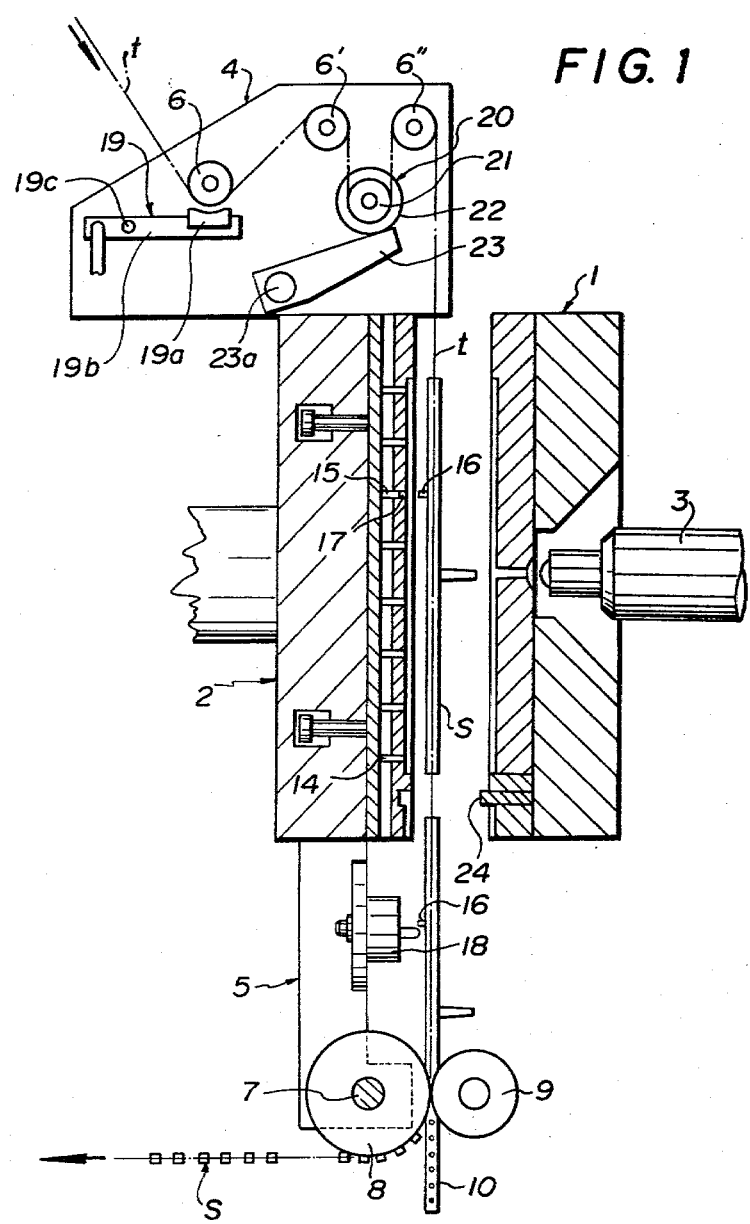

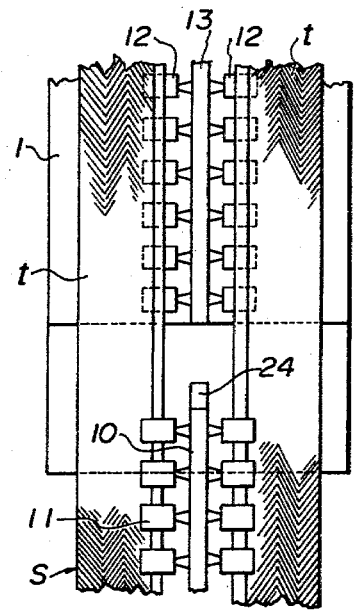
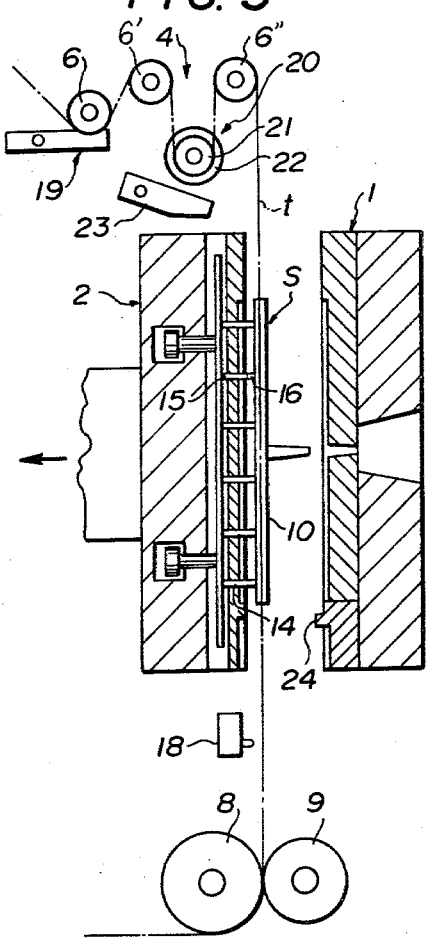

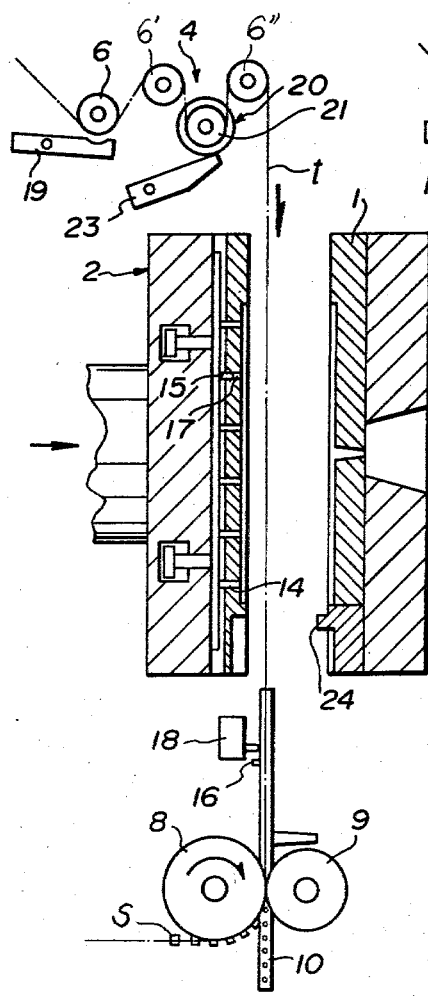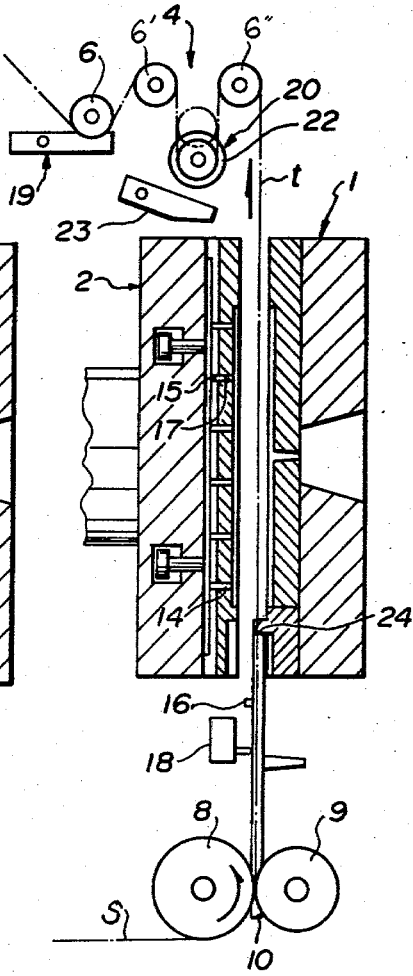

APPARATUS FOR INJECTION MOLDING OF CONTINUOUS SLIDE FASTENER CHAIN

BACKGROUND OF THE INVENTION

1. Field of the Invention:

This invention relates to an injection molding apparatus for providing a continuous length of slide fastener chain by repeating the steps of advancing intermittently a pair of stringer tapes through the spacing between a pair of molds of injection molding means, closing the molds on the tapes during the pauses in the advance of the tapes to injection-mold fastener elements along the opposing inner edges thereof, and subsequently opening the molds to permit the advance of the tapes in the form of a molded slide fastener chain.

2. Description of the Prior Art:

In the repetitive injection molding of fastener elements with the injection molding apparatus of the type described, it is known that the molded fastener elements will be attached to the stringer tapes askew and at an irregular pitch unless the stringer tapes are subjected to a constant tension and clamped by the pair of molds at a predetermined position at the time of each molding operation. It is also known that the molding requires that the pitch of the fastener element at the connecting portion between a previously molded fastener element row and a subsequently molded fastener element row be the same as the pitch between adjacent ones of the fastener elements which are molded in each fastener element row, or such that a predetermined spacing will be maintained between the previously molded and subsequently molded fastener element rows. To this end, it is conventional practice to apply a tensile force to the tapes by providing the molds with tensioning means, and further to control the feed of the fastener element-equipped tapes, namely the fastener chain, through the use of positioning means so as to maintain a predetermined spacing between fastener elements at the portions where a previously molded fastener element row adjoins a subsequently molded fastener element row. A basic method of carrying out such positioning, for example as disclosed in Japanese Patent Public Disclosure No. 134533/77, comprises clamping the molded fastener chain in a clamping device to feed constant lengths of the fastener chain by means of a feed cylinder, and retaining the posterior end of previously molded fastener chain in place by bringing a pressing plate into pressured contact with a guide plate provided on one of the molds. Another method as disclosed in Japanese Patent Publication No. 4771/63 comprises feedng previously molded fastener chain by an amount greater than that required to feed the fastener chain up to a fixed position, and then causing the fastener chain to return or move back by the amount of the extra feed to set the stringer tapes at the predetermined position. However, the actual method of moving back the stringer tapes makes use of a retaining body for a roller that supports the stringer tapes, as well as a pinion and rack adapted to shift the roller retaining body in the direction that causes the stringer tapes to move back. The apparatus for practicing this method therefore becomes extremely complicated, as does that of the former example which relies upon the clamping device.

SUMMARY OF THE INVENTION

It is therefore an object of the present invention to provide an apparatus for the injection molding of continuous slide fastener chain, which apparatus, through a compact and simple construction, not only makes it possible to mold a row of fastener elements on stringer tapes at an accurate pitch but also enables a predetermined constant spacing to be reliably provided between the last fastener element in a fastener element row previously molded on a stringer tape and the first fastener element in a fastener element row molded on the stringer tape at a subsequent time.

In accordance with the present invention, accurate positioning of the tapes preparatory to the next molding cycle is realized through a method comprising feeding molded fastener chain in excess by an amount greater than that required for the stringer tapes to be set at a fixed position, and subsequently moving back the stringer tapes by that portion of their length fed in excess while at the same time applying a predetermined tensile force to the tapes being introduced through the spacing between a pair of metallic molds. The feature of the present invention resides in a simplification of the arrangement for controlling the extra amount of feed during the feeding operation, and in the fact that the tapes are moved back or retracted while under tension due to being stretched in the direction of retraction as they are moved back.

Other objects, advantages and features of the invention will be apparent from the following description of the preferred embodiment taken in conjunction with the accompanying drawings.

BRIEF DESCRIPTION OF THE DRAWINGS

FIG. 1 is a cross-sectional view illustrating the essential portion of an apparatus for injection molding the fastener elements of a continuous slide fastener chain in accordance with the present invention;

FIG. 2 is a plan view taken from above a stationary metallic mold and illustrating a condition where previously molded fastener chain are positioned for the following injection molding operation; and FIGS. 3, 4 and 5 are cross-sectional views of the molding apparatus illustrating the fastener chain molding process.

DETAILED DESCRIPTION OF THE PREFERRED EMBODIMENT

As illustrated in the drawings, a stationary metal mold 1 and movable metal mold 2 are disposed in an upright posture and arranged so that a synthetic resin casting material can be injected from the side thereof by means of an injection cylinder 3. The movable mold 2 has a tape introducing portion 4 at its upper end and a fastener chain feeding portion 5 at its lower end, the stringer tape introducing portion 4 being provided with a plurality of guide rollers 6, 6', 6'' and the fastener chain feeding portion 5 having a feed roller 8 and a pressure roller 9, with the feed roller 8 being connected to a drive shaft 7. As in the prior art, the movable mold 2 includes cavities 12, 12 for molding fastener elements 11, a cavity 13 serving as a channel for distributing the synthetic resin casting material to the cavities 12, 12, and a plurality of ejector pins 14, 15 for dislodging from the movable mold 2 the incomplete articles molded by the cavities 12, 13. Unlike the prior art, however, a single ejector pin 15, located off-center and nearer the side of the stringer tapes introducing portion 4, is shorter than the other pins 14 and therefore defines still another cavity 17, with the result that a small projection 16 is formed on a runner 10 which is molded by the cavity 13. The small projection 16 molded in this manner is employed to effect conrol of a subsequent operation which will be described later. The fastener chain feeding portion 5 includes the pressure roller 9 and the feed roller 8 which has a cutter for severing the runner fom each of the fastener elements, the rotating direction of feed roller 8 being reversed at the time that the tapes are moved back or retracted. The fastener chain feeding portion 5 is further provided with a vertically adjustable detection member 18 such as a limit switch for detecting the projection 16.

The tape introducing portion 4 includes guide rollers 6, 6', 6" and a braking member 19 opposing the roller 6 operable to receive stringer tapes t introduced from the outside, the braking member 19 acting to arrest the advance of the tapes t by bringing the tapes into pressured contact with the roller 6. The braking member 19 includes a pressing piece 19a provided on a rocker arm 19b which is coupled to a solenoid that is not shown in the drawings, the rocker arm 19b being capable of effecting rocking movement about a pivot pin 19c. Provided between the pair of rollers 6', 6" that lead the tapes t to the clearance between the molds 1, 2 is a tape tensioning portion 20 comprising a roller 21 adapted for vertical movement in the manner of a movable pulley, a balance weight 22 attached to the roller 21, and a restraining lever 23 which pivots about a pivot shaft 23a so as to contact the balance weight 22 and thus check the descent of the roller 21. The mechanism which operates the restraining lever 23, though not illustrated in the drawings, may comprise a rack, a pinion and a cylinder adapted to drive the rack so as to move the retaining lever 23 away from the balance weight 22.

The starting of the braking member 19 and the tape tensioning portion 20 as well as the halting and reversal of the feed roller 8 are effected in response to an electric signal issued by the detection member 18 upon its detecting the small projection 16. The detection member 18 is adapted so that after the issuance of a single pulse no further pulses can be generated before the lapse of a constant period of time.

Erected on the stationary mold 1 is a stopper 24 that abuts the posterior end of the retracted molded runner 10 to limit the retraction of the stringer tapes t. The runner 10 which has been cut off by the cutter provided on the feed roller 8 is guided so as to descend along a vertical line, thus leaving fastener chain s which is led transversely away from the apparatus.

With the arrangement described above, the tapes t introduced between the molds 1, 2 under a predetermined tension, as shown in FIG. 3, are clamped in place by the molds 1, 2 at which time the fastener elements are injection molded. The movable mold 2 is then separated from the stationary mold 1 at the same time that the molded article is dislodged from the cavities 12, 13, 17 by the ejector pins 14, 15. The braking member 19 and the tape tensioning portion 20 of the tape introducing portion 4 are in operation at this time. However, as shown in FIG. 4, the braking member 19 is released as the movable mold 2 again advances toward the stationary mold 2, while the tension roller 21 of the tape tensioning portion 20 remains locked in position so that it cannot descend. In the meantime the feed roller 8 drives and hence feeds the fastener chain s. During the feeding operation, the small projection 16 molded on the runner 10 is detected by the detection member 18. At the instant of such detection the feed roller 8 is halted to stop the feeding of the fastener chain s simultaneously with the actuation of the braking member 19 to lock the tapes t at the entrance to the tape introducing portion 4 and in concurrence with the release of the restraining lever 23 of the tape tensioning portion 20 which therefore allows the tension roller 21 to descend and upwardly retract the tapes t. The feed roller 8 now rotates in the reverse direction so as not to impede the retraction of the tapes. It should be noted here that the detection member 18 is adjusted and set beforehand at such a position as will allow detection of the projecton 16 when the posterior end of the molded runner 10 descends to a point below the position of the stopper 24 of the stationary mold 1. The tapes t are thus retracted and hence raised; however, before the molds 1, 2 are closed again the posterior end of the previously molded runner 10 abuts against the stopper 24 to prevent any further elevation of the runner. This completes the positioning of the tapes preparatory to the next injection molding cycle and allows the balance weight 22 to apply a tensile force to the tapes t and therefore subject the tapes to a predetermined tension. The molds 1, 2 are now closed to effect the ensuing injection molding of the fastener elements. Repeating the foregoing operation results in the formation of continuous lengths of slide fastener chain s.

As described above, the apparatus for the continuous injection molding of slide fastener chain according to the present invention includes a stationary mold provided with a stopper, a movable mold provided with ejector pins one of which is shortened to furnish a cavity for forming a small projection on a runner, a detection member provided on a fastener chain feeding portion of the movable mold and adapted to detect the small projection formed on the runner, as well as a braking member and tape tensioning member provided on a tape introducing portion, the braking member, tape tensioning portion and a feed roller being controlled in response to an electric signal delivered by the detection member upon its detecting the small projection formed on the runner. The tapes, upon having been fed a predetermined distance, are retracted by the operation of the tape tensioning portion which also subjects the tapes to a constant tensile force after a predetermined length of the tapes has been retracted. The operation of disposing the stringer tapes at the predetermined position within the molds can therefore be reliably carried out despite the extremely simple construction of the apparatus. In addition, the fact that the cavity which molds the small projection on the runner is formed merely by shortening one of the ejector pins enables the molds to be readily fabricated and also enables already manufactured molds to be employed after a simple modification thereof.

I claim:

1. In combination with an injection molding apparatus of the type wherein a continuous slide fastener chain is manufactured by repeating the steps of moving a movable mold relative to a stationary mold to intermittently open and close the molds, injection molding a row of fastener elements on portions of a pair of stringer tapes introduced through and positioned between said molds when said molds are closed, and then interrupting the positioning of said stringer tapes and subsequently feeding the same when said molds are opened preparatory to an ensuing injection molding operation, the improvement which comprises:

means for forming a projection on a portion of a runner molded together with said row of fastener elements at the time of injection molding;

means for halting the introduction of said tapes into the spacing between said molds in response to detection of said projection; and means for retracting and tensioning said tapes already introduced in the spacing between said molds in order to position within said molds the portion of said tapes on which rows of fastener elements are to be subsequently injection molded, the posterior end of said runner previously molded on said tapes together with the rows of fastener elements serving as a standard for the positioning of said tapes.

2. An injection molding apparatus according to claim 1, in which:

said movable mold includes ejector pins for dislodging fastener chain including the molded rows of fastener elements therefrom by the action of said ejector pins;

said means for forming a projection being that one of said ejector pins is shorter in length than the others in order to form a small projection on a runner which is being formed together with said rows of fastener elements at the time of injection molding;

said means for halting being a projection detector for generating a stop signal to halt the introduction of said tapes in response to detection of said projection at the time said fastener chain is fed, and a braking mechanism for halting the introduction of said tapes upon receipt of said stop signal;

said means for retracting and tensioning being a tape tensioning mechanism adapted to retract the already introduced tapes simultaneously with the operation of said braking mechanism; and said stationary mold includes a stopper that abuts against the posterior end of said runner fused on to said fastener chain retracted by the operation of said tape tensioning mechanism, said tapes thereby being halted at a fixed position.

* * * * *

UNITED STATES PATENT AND TRADEMARK OFFICE
CERTIFICATE OF CORRECTION

PATENT NO. : 4,226,577
DATED : October 7, 1980
INVENTOR(S) : MITSUO SAWADA

It is certified that error appears in the above—identified patent and that said Letters Patent is hereby corrected as shown below:

On the title page; between

[76]    Inventor: Mitsuo Sawada, 1-1-Horitaka
                            Kurobe-shi, Toyama-ken, Japan and

[21]    Appl. No.: 54,421

Insert the following line:

[73]    Assignee: Yoshida Kogyo, K. K.
                           Tokyo, Japan

Signed and Sealed this

Third Day of March 1981

[SEAL]

*Attest:*

*Attesting Officer*

RENE D. TEGTMEYER

*Acting Commissioner of Patents and Trademarks*